US008891910B2

(12) United States Patent
Dell'Orto et al.

(10) Patent No.: US 8,891,910 B2
(45) Date of Patent: Nov. 18, 2014

(54) ASSEMBLY FOR MONITORING OUTPUT CHARACTERISTICS OF A MODULATOR

(75) Inventors: Flavio Dell'Orto, Desio (IT); Giuseppe Cusmai, San Giuliano Milanese (IT); Stefano Balsamo, Milan (IT); Marco Villa, Cabiate (IT)

(73) Assignee: Oclaro Technology Limited, Northamptonshire (GB)

( * ) Notice: Subject to any disclaimer, the term of this patent is extended or adjusted under 35 U.S.C. 154(b) by 0 days.

(21) Appl. No.: 13/991,868

(22) PCT Filed: Dec. 6, 2011

(86) PCT No.: PCT/GB2011/052405
§ 371 (c)(1),
(2), (4) Date: Jul. 11, 2013

(87) PCT Pub. No.: WO2012/076869
PCT Pub. Date: Jun. 14, 2012

(65) Prior Publication Data
US 2013/0306848 A1    Nov. 21, 2013

(30) Foreign Application Priority Data

Dec. 10, 2010 (GB) .................................. 1020972.4

(51) Int. Cl.
*G02F 1/01* (2006.01)
*G02F 1/225* (2006.01)

(52) U.S. Cl.
CPC .............. *G02F 1/225* (2013.01); *G02F 1/2255* (2013.01); *G02F 2201/212* (2013.01)
USPC ......................................... 385/1; 250/227.11

(58) Field of Classification Search
CPC .................................. G02F 1/225; G02B 6/30
USPC .......................................... 385/1; 250/227.11
See application file for complete search history.

(56) References Cited

U.S. PATENT DOCUMENTS

| | | | | |
|---|---|---|---|---|
| 5,412,743 A | * | 5/1995 | Brazas, Jr. | 385/2 |
| 6,516,119 B2 | * | 2/2003 | Menezo et al. | 385/37 |
| 6,668,103 B2 | * | 12/2003 | Hosoi | 385/2 |

(Continued)

FOREIGN PATENT DOCUMENTS

| | | | | |
|---|---|---|---|---|
| EP | 1170837 A1 | * | 1/2002 | H01S 3/094 |
| EP | 1868025 A1 | * | 12/2007 | G02F 1/225 |
| GB | 2266160 A | | 10/1993 | |
| JP | 2003-145623 A | | 6/1991 | |
| JP | 03145623 A | * | 6/1991 | G02F 1/03 |

(Continued)

OTHER PUBLICATIONS

PCT International Search Report and Written Opinion, Application No. PCT/GB2011/052405 dated Feb. 17, 2012, 15 pages.

(Continued)

*Primary Examiner* — Peter Radkowski
(74) *Attorney, Agent, or Firm* — Fenwick & West LLP

(57) ABSTRACT

A photonic assembly is described. The assembly comprises a substrate. An optical modulator (100) in or on the substrate has an output port coupled to an output waveguide (106) mounted in or on the substrate. A spiller waveguide (107, 108) is mounted in or on the substrate. The spiller waveguide (107, 108) has an input end (109, 110) physically separated from but proximate to the output waveguide (106) so as to collect light spilt from the output port or output waveguide (106). The modulator (106) may be a MZI modulator.

20 Claims, 4 Drawing Sheets

(56) References Cited

U.S. PATENT DOCUMENTS

| | | |
|---|---|---|
| 7,184,623 B2 * | 2/2007 | Cai et al. ............... 385/28 |
| 7,200,289 B2 * | 4/2007 | Yamada et al. ........... 385/3 |
| 7,359,581 B2 * | 4/2008 | Miyazaki et al. ......... 385/3 |
| 7,373,030 B2 * | 5/2008 | Gao et al. ............... 385/14 |
| 7,532,778 B2 * | 5/2009 | Yamada et al. ........... 385/3 |
| 2002/0012119 A1 * | 1/2002 | Menezo et al. .......... 356/300 |
| 2004/0114208 A1 * | 6/2004 | Balsamo et al. ......... 359/254 |
| 2004/0120633 A1 * | 6/2004 | Gao et al. .............. 385/14 |
| 2005/0105848 A1 * | 5/2005 | Yamada et al. .......... 385/31 |
| 2005/0265653 A1 * | 12/2005 | Cai et al. .............. 385/28 |
| 2006/0127011 A1 | 6/2006 | Blauvelt et al. |
| 2006/0133713 A1 * | 6/2006 | Yamada et al. .......... 385/5 |
| 2007/0070487 A1 | 3/2007 | Tian |
| 2007/0076999 A1 * | 4/2007 | Miyazaki et al. ......... 385/8 |
| 2009/0097843 A1 | 4/2009 | McBrien |

FOREIGN PATENT DOCUMENTS

| | | | | |
|---|---|---|---|---|
| JP | 2005-053086 A | | 3/1993 | |
| JP | 05053086 A | * | 3/1993 | ............. G02F 1/035 |
| JP | 2001-264575 | | 9/2001 | |
| JP | 2005-202429 A | | 7/2005 | |
| JP | 2005202429 A | * | 7/2005 | ............. G02B 6/30 |
| JP | 2008-180997 A | | 8/2008 | |

OTHER PUBLICATIONS

GB Search Report, Application No. GB1020972.4 dated Mar. 9, 2011, 4 pages.

Patent Cooperation Treaty, International Preliminary Report on Patentability, International Patent Application No. PCT/GB2011/052405, Jun. 12, 2013, 9 Pages.

* cited by examiner

ASSEMBLY FOR MONITORING OUTPUT CHARACTERISTICS OF A MODULATOR

RELATED APPLICATIONS

This application is a 35 U.S.C. 371 national stage filing of International Application No. PCT/GB2011/052405, filed on Dec. 6, 2011, which claims priority to United Kingdom Patent Application No. 1020972.4, filed on Dec. 10, 2010. The contents of the aforementioned applications are hereby incorporated by reference.

TECHNICAL FIELD

The present invention relates to a method and assembly for monitoring the output characteristics of optical modulators, and in particular the output characteristics of Mach-Zehnder modulators.

BACKGROUND

In this specification the term "light" will be used in the sense that it is used in optical systems to mean not just visible light, but also electromagnetic radiation having a wavelength outside that of the visible range.

In the field of optical telecommunications components, monolithically integrated optical circuits are widely used. Such optical circuits commonly comprise a plurality of optical waveguides (e.g. ridge waveguides) connected by means of optical splitters, at which light is split or recombined to or from different branch waveguides. Examples of such optical circuits are Mach-Zehnder interferometer (MZI) devices, such as Mach-Zehnder modulators (MZMs). MZMs are used to modulate an optical signal with an electrical data signal by splitting the optical signal into two components, phase modulating one component relative to the other, and recombining the components. With appropriate choice of the phase modulation, constructive and/or destructive optical interference between the components will take place on recombination, resulting in an amplitude modulated combined signal.

Application of a predetermined electrical bias voltage differential to one branch of the waveguide relative to the other branch causes the complex indices of refraction of the material in the branches to vary differently due to the electro-optic effect, such that the effective optical lengths (and absorption) of the branches vary accordingly. At a bias voltage known in the art as $V_\pi$, the effective optical lengths have varied to such an extent that the optical signals emerging from the branches are 180° out of phase compared to the situation when no bias voltage is applied. If the path lengths of an unbiased modulator are the same, then at a bias voltage of $V_\pi$ the optical signals will interfere destructively and cancel each other out, such that a zero output is produced at the optical output. If the path lengths of an unbiased modulator differ by a half integral number of wavelengths, then at a bias voltage of $V_\pi$ the optical signals will interfere constructively so that the optical output signal is essentially similar to the optical input signal. An electrical data signal, normally in the microwave frequency range, is applied to one or both of the arms. The optical carrier signal exiting the device is thus modulated by the data signal.

For many optical communication applications, it is desirable to bias the modulator at a voltage $V_\pi/2$. However, device instabilities and environmental effects, especially temperature variations, cause the operating point to drift over time, and constant readjustment is required to maintain the proper operating point. The bias point must be maintained during operation to achieve maximum dynamic range, since second order harmonic distortion increases rapidly with increasing bias voltage error.

In some circumstances it may also be necessary to monitor the output of the modulator at other operation points (i.e. other bias voltages). In order to monitor this output, a photodiode is generally used to detect light at some point downstream of the modulator.

Mach-Zehnder interferometer based modulators require a very precise control of the operation point on the characteristic curve, in order to get the best performances in transmission (including zero chirp, maximum extinction ratio, 50% crossing on the optical eye). This results in stringent limits on the photodiode both in terms of process control and in terms of phase shift.

New modulation formats impose even more stringent limitations. One key parameter is directivity; that is, it must be possible for the photodiode to detect when no power is emitted through the output port.

Conventional structures adopted in the prior art for monitoring output characteristics include angled mirrors, coupling through the substrate of the optical device (as described, for example, in U.S. Pat. No. 6,668,103 and US 2005/0105848) or through the fibre block used to connect the device to the output fibre.

Another way to obtain good isolation is to use an optical 3 dB coupler instead of a Y-branch as the combiner on the output of the modulator interferometer. However, this solution makes the device extremely sensitive to waveguide process variations and to wavelength.

It would be desirable to monitor of the output characteristic of a Mach-Zehnder interferometer (MZI) modulator without degrading the output characteristic of the modulator itself. It would also be desirable to maintain a strong isolation with the output waveguide of the device (that is, any optical power coming through the output port of the modulator should not be coupled into the photodiode).

SUMMARY

In accordance with one aspect of the present invention there is provided a photonic assembly. The assembly comprises a substrate and an optical amplitude modulator having at least two arms for transmitting light through an output combiner into an output port coupled to an output waveguide mounted in or on the substrate. A spiller waveguide is mounted in or on the substrate. The spiller waveguide has an input end physically separated from but proximate to the output waveguide so as to collect light spilt from the output port or output waveguide. The modulator may be a MZI modulator.

The input end of the spiller waveguide may be located proximate to the output port of the modulator, and optionally substantially level with the output port of the modulator. The location may be chosen so that, when the modulator is configured such that light passing through the modulator interferes destructively and substantially no light is transmitted through the output port, light radiated away from the output combiner through the substrate is coupled into the spiller waveguide. The location may be further optimised so that, when the modulator is configured such that light passing through the modulator interferes constructively such that there is a maximum transmission through the output port, substantially no light is coupled into the spiller waveguide. The intensity of light coupled into the spiller waveguide may be substantially inversely proportional to the intensity of light transmitted through the output waveguide, and this may therefore be considered as an "inverting" configuration. A "non-inverting" configuration is also possible. In this embodiment, the input end of the spiller waveguide is located downstream of the output port and sufficiently close to the output waveguide that evanescent waves generated by light passing through the output waveguide are coupled into the spiller waveguide. The input end of the spiller waveguide may be located sufficiently far downstream from the output port to enable filtering of higher-order modes (for example between about 1000 and about 3000 times the operating wavelength of the modulator), and the intensity of light coupled into the spiller waveguide may be substantially proportional to the intensity of light transmitted through the output waveguide.

The light collected by the spiller waveguide (whether in the inverting or non-inverting configuration) may have substantially no effect on the transmission of light through the output waveguide.

The light collected by each of the spiller waveguide may exhibit a phase shift in an intensity transmission curve compared to the intensity transmission curve of the modulator. In order to compensate for this, the assembly may comprise two spiller waveguides having input ends located substantially equidistantly either side of the output waveguide. The total light collected by both spiller waveguides together may then exhibit substantially no phase shift in the transmission curve.

The assembly may further include a photodetector (such as a photodiode) coupled to each spiller waveguide for detecting the intensity of light passing along that spiller waveguide. If there are two spiller waveguides, a single photodetector may be coupled to both so as to detect the total intensity of light passing along both spiller waveguides simultaneously.

The photodetector may be located above the spiller waveguide such that an evanescent wave generated by light travelling along the spiller waveguide is coupled into the photodetector. If there are two spiller waveguides coupled to a single photodetector, this would mean that the photodetector also straddles the output waveguide. If this is the case, the photodetector may include a groove in an underside thereof above the output waveguide to prevent evanescent coupling from the output waveguide into the photodetector.

The photodetector may alternatively be located above the or each spiller waveguide, with an angled mirror being provided in the or each spiller waveguide for coupling light into the photodetector.

In another alternative, an interface may be provided to couple light from the or each spiller waveguide to an external fibre.

The input end of the spiller waveguide may be tapered, and the taper may be truncated.

In accordance with another aspect of the present invention there is provided a method of monitoring the output characteristics of an optical modulator mounted in or on a substrate. The method comprises passing light through at least two arms of the modulator into an output combiner, output port and thence into an output waveguide. Light spilt from the output port or output waveguide is collected through an input end of at least one spiller waveguide mounted in or on the substrate, the input end being physically separated from but proximate to the output waveguide. The method further comprises detecting the light transmitted along the or each spiller waveguide.

BRIEF DESCRIPTION OF THE DRAWINGS

Some preferred embodiments of the invention will now be described by way of example only and with reference to the accompanying drawings, in which.

DETAILED DESCRIPTION

Figure 1A:
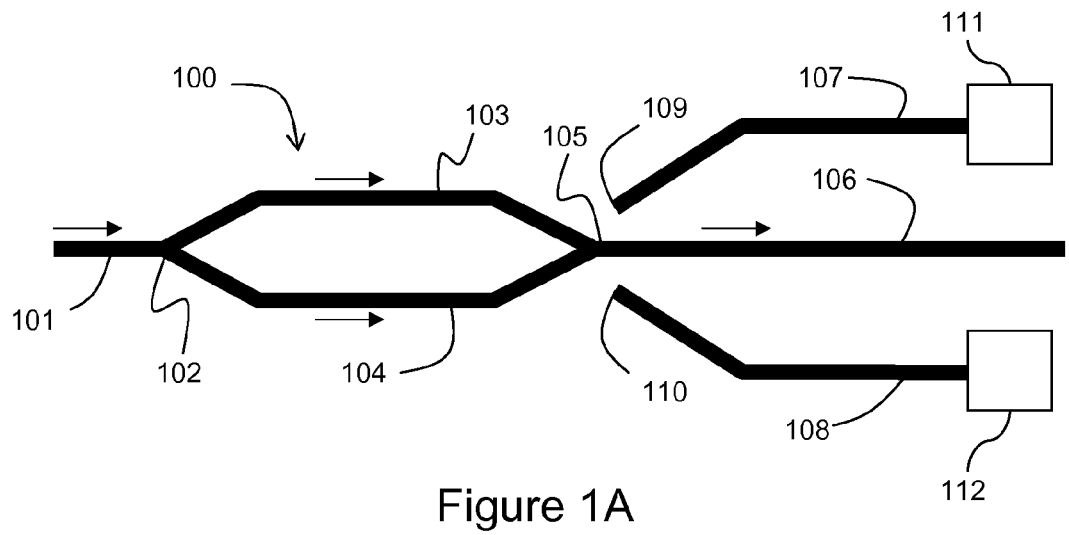
FIG. 1A is a schematic top view of a Mach-Zehnder Interferometer type modulator and spiller waveguides, illustrating the general path of light during constructive interference.

The following discussion addresses the problem of monitoring the output of a Mach-Zehnder electro-optic device with sufficient sensitivity while keeping its main output (i.e., the part which couples to an external fibre) essentially unperturbed. Moreover, the monitor must be unaffected by light which can be coupled inside the device from the output port. It is also desirable that the transfer curve of a photodiode used as a detector must exhibit a small phase shift compared to that of the MZI device.

The approach described below is based on "waveguide spillers" which are positioned generally sideways from a Y-junction output of an MZI to catch light from the waveguide in a desired configuration and take it to a properly positioned photodiode. The photodiode can be then coupled to the waveguide in several different ways, for example butt-coupling, vertical co-directional (evanescent) coupling or vertical direct coupling (direct through a mirror which steers the light upwards from the waveguide).

FIG. 1 is a schematic top view of an electro-optic assembly including a MZI modulator 100. The assembly includes waveguides formed in or on a monolithic substrate (not shown) formed of an electro-optic material such as $LiNbO_3$ or InP. An input waveguide 101 is coupled to a splitter 102, the output of which is coupled to two modulator arms 103, 104. An output combiner 105 is coupled to the outputs of the arms 103, 104, and an output waveguide 106 is coupled to the output port of the combiner 105. Further electronics (not shown) are applied to the modulator arms 103, 104 to bias these waveguides so as to modify their optical path length, and thus the phase of light arriving at the combiner 105.

Two monitoring waveguides (herein generally referred to as "spiller waveguides") 107, 108 are also formed in or on the substrate. The spiller waveguides 107, 108 are not coupled directly to the output of the MZI modulator 100, but have input ends 109, 110 located a short distance away. Photodetectors (usually photodiodes) 111, 112 are coupled to the spiller waveguides for detecting light passing therethrough.

FIG. 1A illustrates the passage of light through the assembly when the modulator arms 103, 104 are biased so that light passing through the two arms is in phase when recombined in the combiner 105 (i.e. the phase difference ΔΦ between light passing the arms 103, 104 is a multiple of 2π). In this situation, the light from the two arms interferes constructively at the output 105 and substantially all of the light is transmitted along the output waveguide 106. Very little or no light is transmitted into the spiller waveguides 107, 108.

Figure 1B:
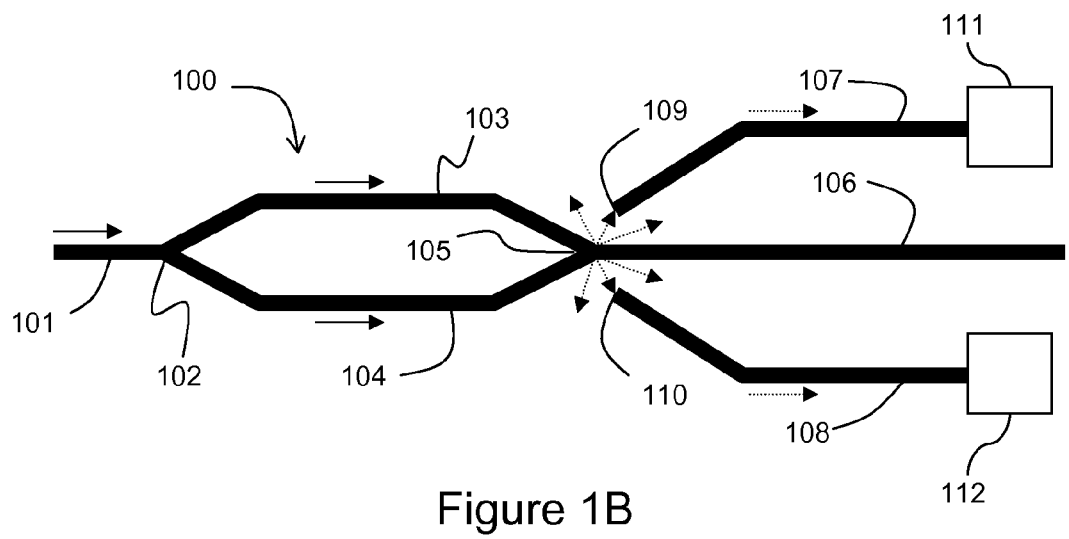
FIG. 1B is a schematic top view of the assembly of FIG. 1A, illustrating exemplary light paths during destructive interference.

FIG. 1B illustrates the behaviour of light in the modulator 100 when the arms 103, 104 are biased so that the phase difference ΔΦ between light passing the arms 103, 104 is an odd multiple of π, so that light passing through the two arms is out of phase when recombined in the combiner 105 and interferes destructively. The light transmitted along the output waveguide now has a theoretical amplitude of zero, and so is at a minimum. Instead, light is radiated in all directions though the substrate (or "spilt"), and some of this light enters the spiller waveguides 107, 108. It is transmitted along these waveguides and detected by the photodetectors 111, 112.

It is thus apparent that the intensity of light detected by the photodetectors 111, 112 is generally inversely proportional to the intensity of light transmitted along the output waveguide 106 of the modulator 100. This arrangement could therefore be said to be an "inverting" configuration. When the transmission through the output waveguide 106 is at a maximum, the signal detected by the photodetectors 111, 112 is a minimum, and when the transmission through the output 106 is at a minimum, the signal detected by the photodetectors is at a maximum.

It will also be apparent that the presence of the spiller waveguides has no perturbation effect on the output characteristics of the modulator 100. When the modulator operates as shown in FIG. 1A, all of the light is transmitted through the output waveguide 106. When operated as shown in FIG. 1B, light will be radiated through the substrate from the combiner 105 whether or not the spiller waveguides 107, 108 are present.

FIGS. 1A and 1B illustrate the input ends 109, 110 of the spiller waveguides 107, 108 as being located offset and slightly downstream from the output combiner 105. Their precise position will depend on various optimisation factors, but it will be appreciated that they could be located directly either side of the combiner or further downstream if necessary, so as to detect radiated light most efficiently.

Figure 2A:
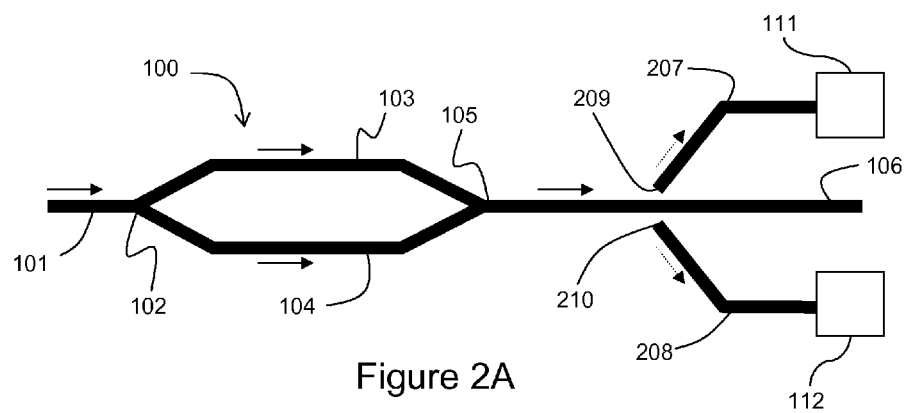
FIG. 2A is a schematic top view of an alternative arrangement of a MZI modulator and spiller waveguides, illustrating exemplary light paths during constructive interference.

FIG. 2A is an illustration of an alternative assembly, which operates in a non-inverting configuration. Most of the elements of FIG. 2A are similar to those of FIG. 1A and are designated by the same reference numerals. In the assembly of FIG. 2, two spiller waveguides 207, 208 have input ends 209, 210 located close to the output waveguide 106 and further downstream than the input ends 109, 110 of the spiller waveguides 107, 108 shown in FIG. 1A.

The input ends 209, 210 are located sufficiently close to the output waveguide 106 that evanescent waves close to the output waveguide 106 are coupled into the spiller waveguides 207, 208. The intensity of light coupled into the spiller waveguides 107, 108 (and therefore detected by the photodetectors 111, 112) is therefore generally proportional to the intensity of light travelling along the output waveguide 106.

Figure 2B:
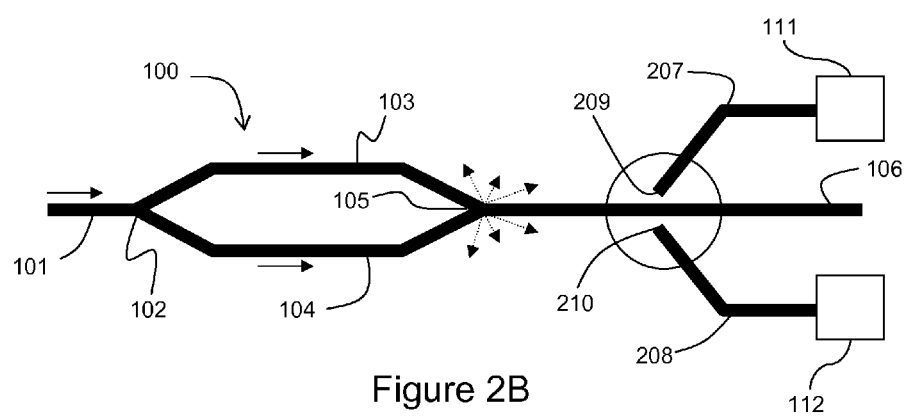
FIG. 2B is a schematic top view of the assembly of FIG. 2A, illustrating exemplary light paths during destructive interference.

As shown in FIG. 2A, the modulator arms 103, 104 are biased so that light passing through the two arms is in phase when recombined in the combiner 105 so as to interfere constructively, resulting in maximum transmission. This results in the maximum possible signal at the photodetectors 111, 112. FIG. 2B illustrates the behaviour of light when the light passing through the modulator arms 103, 104 is out of phase. As in FIG. 1B, no light is transmitted along the output waveguide 106, but light is radiated through the substrate. Since no light is emitted along the output waveguide, there is no evanescent wave to couple into the spiller waveguides 207, 208 and no signal at the photodetectors 111, 112. Minimum transmission through the output waveguide 106 results in a minimum signal at the photodetectors 111, 112.

The location of the spiller waveguides 207, 208 is chosen such that the input ends 209, 210 are a sufficient distance along the output waveguide 106 to allow complete filtering of unwanted higher-order modes. The optimum coupling distance should be chosen so that the coupling of the spiller waveguides will have the minimum possible parasitic effect on the output waveguide 106. In general, this coupling distance may be chosen to be in a range between about 1000 and about 3000 times the central wavelength of operation of the modulator. For example, the coupling distance of a modulator operating at 1550 nm may be greater that about 1 mm.

Figure 3A:
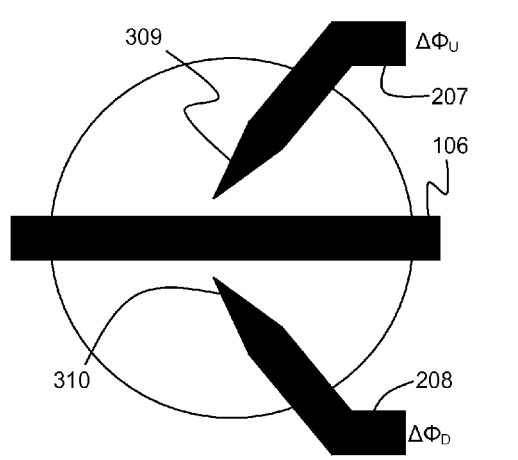
FIG. 3A is a more detailed schematic top view of a portion of the spiller waveguides of FIG. 2A.
Figure 3B:
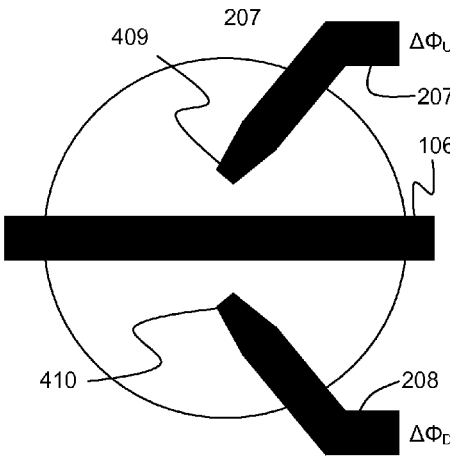
FIG. 3B is a schematic top view of an alternative configuration of the spiller waveguides of FIG. 2A.

FIG. 3A is a more detailed view of the circled portion of FIG. 2B, showing a possible configuration for the input ends 209, 210 of the spiller waveguides 207, 208. As shown in FIG. 3A, the spiller waveguides 207, 208 have sharp tips 309, 310 at their input ends. This arrangement has a high efficiency, but FIG. 3B illustrates an arrangement with truncated tips 409, 410 which allows better repeatability with a lithographic process. It will be appreciated that the tips shown in FIGS. 3A and 3B may also be used as the input ends of the spiller waveguides 107, 108 shown in FIGS. 1A and 1B.

FIG. 3 also illustrates phase shifts $\Delta\Phi_U$, $\Delta\Phi_D$ present in the "upper" and "lower" spiller waveguides 207, 208 compared to the output waveguide 106. These are shifts in phase of the transmission curve in each spiller waveguide compared to that of the modulator. In other words, when the modulator is at its maximum or minimum transmission, each spiller waveguide is at a slightly different point of its characteristics (i.e. not a precise maximum or minimum), whether inverting or not: this difference is called phase shift of the monitor curve.

The placement and dimensions of the tips are optimised in order to minimise this phase shift and to optimise the power coupling from the waveguide without affecting the modulator. In practice, the transmission curve phase shift is wavelength-dependent, so a complete optimisation is thus never possible in the whole C+L band. Furthermore, small process variations induce considerable changes in this parameter, which is an important factor in assessing the monitor performances. Moreover, phase shifts greater than 5° cannot be tolerated for coherent formats with high-bit rates (e.g. polarisation multiplexing at 40 Gb/s or 100 Gb/s (POLMUX 40G, POLMUX 100G) and high level Quadrature amplitude modulation (such as 8-QAM, 16-QAM, 64-QAM and higher level QAM)).

However, it has been discovered that the phase shifts $\Delta\Phi_U$, $\Delta\Phi_D$ are generally equal in magnitude and opposite in sign if the input ends 109, 110, 209, 210 of the spiller waveguides are equidistant from the output waveguide 106. This fact can then be used to compensate for the phase shifts in the individual spiller waveguides. The compensation is achieved by coupling the outputs of both spiller waveguides 107, 108, 207, 208 into a single photodetector, as shown in FIG. 4.

Figure 4:
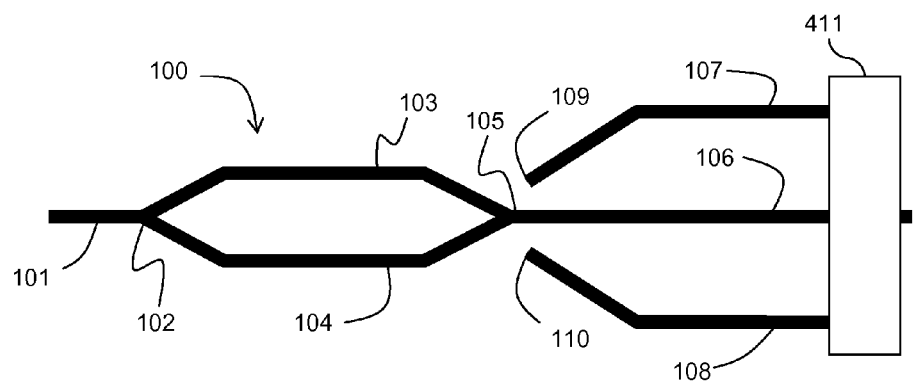
FIG. 4 is a schematic top view of an alternative arrangement of an MZI modulator and spiller waveguides.

FIG. 4 is a schematic top view illustration of a modulator 100 similar to that shown in FIGS. 1 and 2. However, instead of a photodetector 111, 112 coupled to each spiller waveguide 107, 108, a single photodetector 411 detects light passing through both spiller waveguides 107, 108. The overall intensity of light detected by the photodetector 411 thus exhibits extremely low overall phase shift, because of effective compensation between the two spiller waveguides 107, 108. This low phase shift will apply regardless of the operating wavelength and despite strong changes of the waveguide fabrication process. It will be appreciated that the combined photodetector can also be used for a modulator as shown in FIG. 2. It will also be appreciated that it may be possible to use two separate photodetectors 111, 112 (as shown in FIGS. 1 and 2) and combine the output signals of these two photodetectors to achieve the same effect.

The photodetector can be coupled to the spiller waveguides in a number of different ways. It is often convenient to locate the or each photodetector on top of the waveguides, resulting in a monolithically integrated device. If this is the case, the photodetector can operate by vertical co-directional (evanescent) coupling or vertical direct coupling (direct through a mirror which steers the light upwards from the waveguide).

Figure 5A:
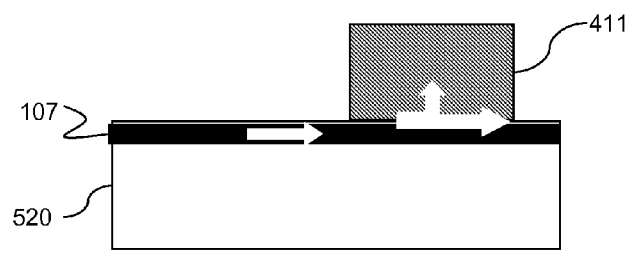
FIG. 5A is a schematic side view of an assembly for detecting light passing through a spiller waveguide using evanescent coupling.

FIG. 5A is a schematic side view of a spiller waveguide 107 in a substrate 520, with a photodetector 411 located above the substrate. An evanescent wave generated by light travelling along the waveguide is coupled into the photodetector 411. This approach allows simple positioning of the photodetector 411, but it will be appreciated that a problem arises when a single photodetector 411 covering both spiller waveguides 107, 108 is used, as shown in FIG. 4, since the photodetector 411 also straddles the output waveguide 106.

In order to prevent evanescent coupling from the output waveguide 106 into the photodetector 411, a central groove is located in the underside of the photodetector 411 above the output waveguide 106 so that the photodetector 411 is physically separated from the output waveguide 106.

Figure 5B:
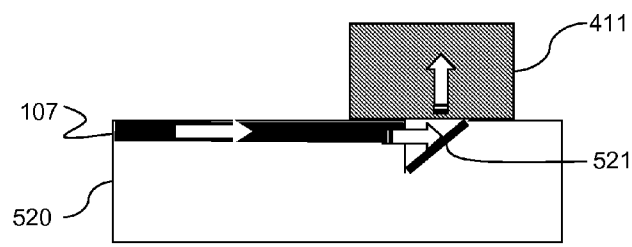
FIG. 5B is a schematic side view of part of an assembly for detecting light passing through a spiller waveguide using an angled mirror.

FIG. 5B illustrates vertical direct coupling from the spiller waveguide 107, via an angled mirror 521, into the photodetector 411. The mirror 521 can be fabricated through mechanical etching, chemical (RIE or similar) etching, laser ablation, etc. as it is conventionally done in PLC and similar devices. If this approach is used, no groove is required above the central output waveguide 106.

Figure 6:
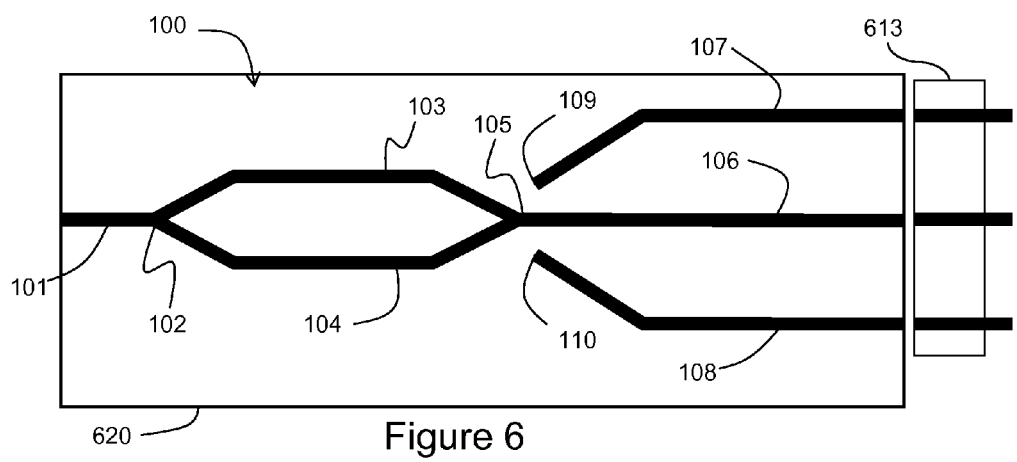
FIG. 6 is a schematic top view of a further alternative arrangement of an MZI modulator and spiller waveguides.

In another alternative, the spiller waveguides can be coupled outside the chip (in which the modulator 100 is mounted) through external fibres, e.g. through a proper fibre block or a fibre ribbon. In this way, the signals can be fed to other components if necessary. This is illustrated in FIG. 6, which shows a fibre block 613 coupled to the outputs of the output waveguide 106 and spiller waveguides 107, 108 of a modulator mounted on a substrate 620. FIG. 6 illustrates the inverting configuration but it will be appreciated the same principles may apply to the non-inverting configuration.

It will be appreciated that variations from the arrangements described above may still fall within the scope of the invention, which is defined by the claims. For example, all of the arrangements described are shown having two spiller waveguides, but it is possible to use other numbers of spiller waveguides. The output characteristics could be monitored using a single spiller waveguide, although this would require correction for the phase shift of the transfer curve. Alternatively, three, four or more spiller waveguides could be provided to optimise the coupling of light into such waveguides.

The invention claimed is:

1. A photonic assembly, comprising:
   a substrate;
   an optical amplitude modulator having at least two arms for transmitting light through an output combiner into an output port coupled to an output waveguide mounted in or on the substrate;
   two spiller waveguides mounted in or on the substrate, the spiller waveguides having input ends physically separated from but proximate to the output waveguide and located substantially equidistantly from either side of the output waveguide so as to collect light spilt from the output port or output waveguide, the spiller waveguides extending away from their input ends in a direction oblique to the output waveguide; and
   a photodetector coupled to both spiller waveguides so as to detect the total intensity of light passing along both spiller waveguides simultaneously.

2. The assembly of claim 1, wherein the input ends of the spiller waveguides are located proximate to the output port of the modulator, the location being chosen so that, when the modulator is configured such that light passing through the modulator interferes destructively and substantially no light is transmitted through the output port, light radiated away from the output combiner through the substrate is coupled into the spiller waveguides.

3. The assembly of claim 2, wherein the location of the input ends of the spiller waveguides is optimised so that, when the modulator is configured such that light passing through the modulator interferes constructively such that there is a maximum transmission through the output port, substantially no light is coupled into the spiller waveguides.

4. The assembly of claim 2, wherein the intensity of light coupled into the spiller waveguides is substantially inversely proportional to the intensity of light transmitted through the output waveguide.

5. The assembly of claim 2, wherein the input ends of the spiller waveguides are located substantially level with the output port of the modulator.

6. The assembly of claim 1, wherein the input ends of the spiller waveguides are located downstream of the output port and sufficiently close to the output waveguide that evanescent waves generated by light passing through the output waveguide are coupled into the spiller waveguides.

7. The assembly of claim 6, wherein the input ends of the spiller waveguides are located sufficiently far downstream from the output port to enable filtering of higher-order modes.

8. The assembly of claim 6, wherein the input ends of the spiller waveguides are located a distance downstream of the output port in a range between about 1000 and about 3000 times an operating wavelength of the modulator.

9. The assembly of claim 6, wherein the intensity of light coupled into the spiller coupler is substantially proportional to the intensity of light transmitted through the output waveguide.

10. The assembly of claim 1, wherein the light collected by the spiller waveguides has substantially no effect on the transmission of light through the output waveguide.

11. The assembly of claim 1, wherein the light collected by each of the spiller waveguides exhibits a phase shift in an intensity transmission curve compared to the intensity transmission curve of the modulator, but the total light collected by both spiller waveguides together exhibits substantially no phase shift in the intensity transmission curve.

12. The assembly of claim 1, wherein the photodetector is located above the spiller waveguides such that an evanescent wave generated by light travelling along each spiller waveguide is coupled into the photodetector.

13. The assembly of claim 12, wherein the photodetector includes a groove in an underside thereof above the output waveguide to prevent evanescent coupling from the output waveguide into the photodetector.

14. The assembly of claim 1, wherein the photodetector is located above the spiller waveguides, the assembly further comprising an angled mirror in each spiller waveguide for coupling light into the photodetector.

15. The assembly of claim 1, wherein the photodetector is a photodiode.

16. The assembly of claim 1, wherein the input end of each spiller waveguide is tapered.

17. The assembly of claim 16, wherein the taper of the input end of each spiller waveguide is truncated.

18. A method of monitoring the output characteristics of an optical modulator mounted in or on a substrate, comprising:
   passing light through at least two arms of the modulator into an output combiner, output port and thence an output waveguide;
   collecting light spilt from the output port or output waveguide through input ends of two spiller waveguides mounted in or on the substrate, the input ends being physically separated from but proximate to the output waveguide and located substantially equidistantly from either side of the output waveguide, the spiller waveguides extending away from their input ends in a direction oblique to the output waveguide; and
   at a single photodetector, detecting the total intensity of light transmitted along both spiller waveguides so as to compensate for a phase shift in a transmission curve in each individual spiller waveguide compared to the transmission curve of the modulator.

19. The method of claim 18, wherein the input ends of the spiller waveguides are located proximate to the output port of the modulator, the method further comprising:
   operating the modulator so that light passing therethrough interferes destructively and substantially no light is transmitted through the output port; and
   coupling light radiated away from the output port through the substrate into the spiller waveguides.

20. The method of claim 18, wherein the input ends of the spiller waveguides are located downstream of the output port, the method further comprising coupling evanescent waves, generated by light passing through the output waveguide, into the spiller waveguides.

* * * * *